United States Patent
Woydack

(10) Patent No.: US 8,938,560 B2
(45) Date of Patent: Jan. 20, 2015

(54) INTERFACE DEVICE FOR CABIN MONUMENTS

(71) Applicant: Airbus Operations GmbH, Hamburg (DE)

(72) Inventor: Joerg Woydack, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 13/707,981

(22) Filed: Dec. 7, 2012

(65) Prior Publication Data

US 2013/0149894 A1 Jun. 13, 2013

Related U.S. Application Data

(60) Provisional application No. 61/568,662, filed on Dec. 9, 2011.

(30) Foreign Application Priority Data

Dec. 9, 2011 (DE) .......................... 10 2011 088 068

(51) Int. Cl.

| G06F 3/00 | (2006.01) |
|---|---|
| G06F 5/00 | (2006.01) |
| H01R 13/60 | (2006.01) |
| H01R 13/66 | (2006.01) |
| H01R 43/00 | (2006.01) |
| H01R 13/62 | (2006.01) |
| H04L 12/10 | (2006.01) |
| H04L 12/44 | (2006.01) |
| H01R 43/26 | (2006.01) |
| B64D 11/00 | (2006.01) |

(52) U.S. Cl.
CPC ................ *H01R 13/62* (2013.01); *H04L 12/10* (2013.01); *H04L 12/44* (2013.01); *H01R 43/26* (2013.01); *B64D 11/00* (2013.01); *B64D 11/0015* (2013.01)
USPC ................................. 710/38; 439/527; 29/825

(58) Field of Classification Search
CPC ........ B64D 11/0015; H04L 45/00; A63F 9/24
USPC ................................. 439/527; 29/825; 710/38
See application file for complete search history.

(56) References Cited

U.S. PATENT DOCUMENTS

| 2007/0077998 A1* | 4/2007 | Petrisor ........................... 463/42 |
|---|---|---|
| 2007/0223382 A1* | 9/2007 | Crabtree et al. .............. 370/236 |
| 2007/0260904 A1 | 11/2007 | Camagna et al. |
| 2010/0195634 A1 | 8/2010 | Thompson |

FOREIGN PATENT DOCUMENTS

DE 10325258 1/2005

\* cited by examiner

*Primary Examiner* — Farley Abad
(74) *Attorney, Agent, or Firm* — Geer, Bruns & Crain Ltd.

(57) ABSTRACT

An interface device for a cabin monument, in particular for assembly in an aircraft or spacecraft, including a routing device, a first plurality of interface connection sockets, which are connected to the routing device via a first plurality of connection lines and to which a vehicle interface of the aircraft or spacecraft can be connected. A second plurality of interface connection sockets are provided which are connected to the routing device via a second plurality of connection lines and to which a cabin monument can be connected. The routing device is constructed so as to selectively electrically connect interface connection sockets of the first plurality of interface connection sockets to interface connection sockets of the second plurality of interface connection sockets.

12 Claims, 1 Drawing Sheet

INTERFACE DEVICE FOR CABIN MONUMENTS

CROSS-REFERENCES TO RELATED APPLICATIONS

This application claims benefit of the U.S. provisional application No. 61/568,662, filed Dec. 9, 2011, and of the German patent application No. 10 2011 088 068.2, filed Dec. 9, 2011, the entire disclosures of which are incorporated herein by way of reference.

FIELD OF THE INVENTION

The present invention relates to an interface device for cabin monuments and a method for electrically connecting cabin monuments to an aircraft or spacecraft.

BACKGROUND OF THE INVENTION

Aircraft passenger cabins which are equipped for transporting passengers, in addition to passenger seats, also comprise fixtures which are provided for meeting the needs of the passengers and/or for use by the passengers. Fixtures of this type in an aircraft passenger cabin, such as toilets or galleys, are also referred to as monuments and are supplied with water, air or the like at the corresponding installation position via the supply lines present in the aircraft, or waste water or waste is removed via disposal lines. For example, there are separate system lines for vacuums, waste water, auxiliary cooling or drinking water, as required.

The functions of the monuments are conducted to the monuments via various electrical data and/or current supply lines. Depending on monument type, the number of interfaces between the monument and the aircraft for implementing electrical lines can be very high.

U.S. Pat. No. 7,800,919 B2 discloses a connection module for connecting connection sockets, a routing unit being provided inside the connection module, which unit implements a flexible routing between input and output connection sockets of the connection module.

EP 1 848 631 A1 discloses an arrangement for flexibly electrically connecting a cabin monument to an aircraft or spacecraft.

US 2010/0195634 A1 discloses a system for providing sub-system communication in an aircraft, comprising a plurality of network interfaces for connecting network apparatuses.

SUMMARY OF THE INVENTION

One idea of the present invention is to provide an interface device, by means of which cabin monuments in an aircraft or spacecraft can be coupled simply, flexibly and without requiring individual wiring of the plug-in connections between the cabin monument and the aircraft or spacecraft.

According to one aspect, the present invention provides an interface device for a cabin monument, in particular for assembly in an aircraft or spacecraft, comprising a routing device, a first plurality of interface connection sockets, which are connected to the routing device via a first plurality of connection lines and to which a vehicle interface of the aircraft or spacecraft can be connected, and a second plurality of interface connection sockets, which are connected to the routing device via a second plurality of connection lines and to which a cabin monument can be connected, wherein the routing device is constructed so as to selectively electrically connect interface connection sockets of the first plurality of interface connection sockets to interface connection sockets of the second plurality of interface connection sockets.

According to a further aspect, the present invention provides a method for electrically connecting a cabin monument to an aircraft or spacecraft, in particular a cabin monument according to the invention, comprising the steps of establishing an electrical connection between the cabin monument and an interface device, which comprises a routing device, via a first plurality of interface connection sockets, establishing an electrical connection between the interface device and a vehicle interface of the aircraft or spacecraft via a second plurality of interface connection sockets, and selectively connecting interface connection sockets of the first plurality of interface connection sockets to interface connection sockets of the second plurality of interface connection sockets by means of the routing device.

According to a further aspect, the present invention provides an aircraft or spacecraft which comprises an interface device according to the invention.

The idea on which the present invention is based consists in providing a standard interface for the electrical connection between cabin monuments and aircraft or spacecraft via which different monument types and different monuments can be connected. In this case, the monument connections are adapted via a routing device which is internal to the interface, by means of which routing device the inputs and outputs of the interface can be individually controlled and interconnected.

An advantage of an interface of this type consists in that the number of plugs to be installed per monument in an aircraft or spacecraft is able to be considerably reduced, since only the standardized interface is used. In addition to saving space and weight in the aircraft or spacecraft, the assembly time of the cabin monuments is also reduced as a result.

A further advantage consists in that the high variation in the type of plug connector can be reduced, in such a way that the increased logistical effort with respect to storage and provision of replacement parts can be dispensed with. Replacing or repairing the cabin monuments is possible by means of the standardized interface without further effort.

A further advantage consists in that, by dispensing with function-related cabling for the different cabin monuments, the installation effort, the space requirements and the total weight of the aircraft or spacecraft can be considerably reduced.

Moreover, the interface ensures flexibility with respect to future developments, for example due to cabin monument functions which are required by regulations. By means of the interface, a change to the basic topology can be dispensed with, since the necessary connection lines can be provided in the routing device by means of a corresponding adaptation.

According to an embodiment of the interface device according to the invention, the routing device can comprise an interface for programming the selective connection of the interface connection sockets. As a result, the interface device advantageously can be individually controlled, for example via a conventional computer.

According to a further embodiment of the interface device according to the invention, the first plurality of interface connection sockets can comprise interface connection sockets for supplying current and/or exchanging data. As a result, all the important connections for a cabin monument can be conducted in a bundled manner via a single interface device, in such a way that the assembly and control effort can be kept low.

BRIEF DESCRIPTION OF THE DRAWINGS

The invention is explained in greater detail in the following by way of embodiments, with reference to the appended figures of the drawings, in which.

DETAILED DESCRIPTION OF THE PREFERRED EMBODIMENTS

Figure 1:
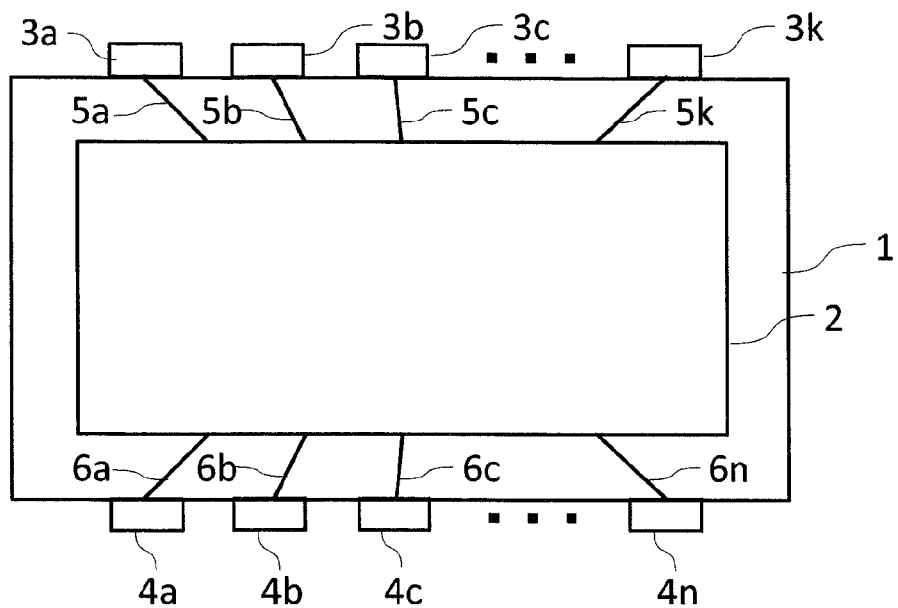
FIG. 1 is a schematic representation of an interface device for the assembly of a cabin monument in an aircraft or spacecraft according to an embodiment of the present invention.

The configurations and developments described can be combined with one another in any desired manner, within reason. Further possible configurations, developments and implementations of the invention also include not explicitly mentioned combinations of features of the invention which are described above or below in relation to the embodiments.

The appended drawings are intended to facilitate a fuller understanding of the embodiments of the invention. They show embodiments and serve, in connection with the description, to illustrate principles and concepts of the invention. Other embodiments and many of the advantages mentioned emerge from the drawings. The elements of the drawings are not necessarily shown to scale in relation to one another. In this case, identical reference numerals denote identical or similar components.

FIG. 1 is a schematic representation of an interface device 1 for the assembly of a cabin monument in an aircraft or spacecraft according to an embodiment of the present invention. The interface device 1 can be used, for example, in an aircraft or spacecraft 9 which is shown schematically in FIG. 2.

The interface device 1 comprises a routing device 2, a first plurality of interface connection sockets 3a, . . . , 3k, and a second plurality of interface connection sockets 4a, . . . , 4n. The interface connection sockets 3a, . . . , 3k can be, for example, vehicle-side interface connection sockets, which can be connected to corresponding interfaces of the aircraft or spacecraft. By way of example, the number of interface connection sockets 3a, . . . , 3k in FIG. 1 is four, however any other number of interface connection sockets 3a, . . . , 3k is also possible. The interface connection sockets 4a, . . . , 4n can be, for example, monument-side interface connection sockets, which can be connected to corresponding interfaces of the cabin monument. By way of example, the number of interface connection sockets 4a, . . . , 4n in FIG. 1 is four, however any other number of interface connection sockets 4a, . . . , 4n is also possible.

The interface connection sockets 3a, . . . , 3k can be, for example, connected to the routing device 2 via a first plurality of connection lines 5a, . . . , 5k, for example to an input-side connection interface of the routing device 2. The interface connection sockets 4a, . . . , 4n can be, for example, connected to the routing device 2 via a second plurality of connection lines 6a, . . . , 6n, for example to an output-side connection interface of the routing device 2.

The routing device 2 is constructed so as to selectively electrically connect interface connection sockets of the first plurality of interface connection sockets 3a, . . . , 3k to interface connection sockets of the second plurality of interface connection sockets 4a, . . . , 4n. The routing device 2 can also receive the bundled signals from the cabin management system of the aircraft or spacecraft via the interface connection sockets 3a, . . . , 3k. The cabin management system can also provide, for example, the current supply for safety-critical cabin components, the current supply for non-safety-critical cabin components and data signals for components of the cabin monument. In this case, the various signals can be fed to the interface device 1 via the various interface connection sockets 3a, . . . , 3k. For this purpose, the interface device 1 can be connected, for example, to a corresponding remote station in the aircraft or spacecraft via a plug-in connection. If certain interface connection sockets are not required, the associated plugs which are not required can be, for example, fixed in a vehicle-side holder.

The routing device 2 can be coupled to corresponding vehicle-side interface connection sockets in a targeted manner by means of the components installed in the cabin monument, in such a way that a central interface for accessing these components by means of the cabin management system is possible. For example, the routing device 2 can receive current from a central current supply unit of the aircraft or spacecraft and provide it to corresponding interface connection sockets 4a, . . . , 4n for the cabin monument. In this case, a bipolar current supply can be provided, for example, to two interface connection sockets 4a, . . . , 4n. Additionally or alternatively, a current supply can be provided to an additional interface connection socket 4a, . . . , 4n, in such a way that a three-phase current supply is made possible for certain components of the cabin monument.

The routing device 2 can process received data via the interface connection sockets 3a, . . . , 3k and output it to suitable interface connection sockets 4a, . . . , 4n for transmission to corresponding components of the cabin monument. In this case, the interface connection sockets 4a, . . . , 4n can be, for example, modularly programmed via software in order to provide adaptation to each cabin monument. For this purpose, the routing device 2 can comprise an interface for programming the selective connection of the interface connection sockets 3a, . . . , 3k and 4a, . . . , 4n, for example an HMI interface for connecting the routing device 2 to a PC, a smartphone or any other computer device by means of which the routing device 2 can be programmed by a user or an engineer.

Figure 2:
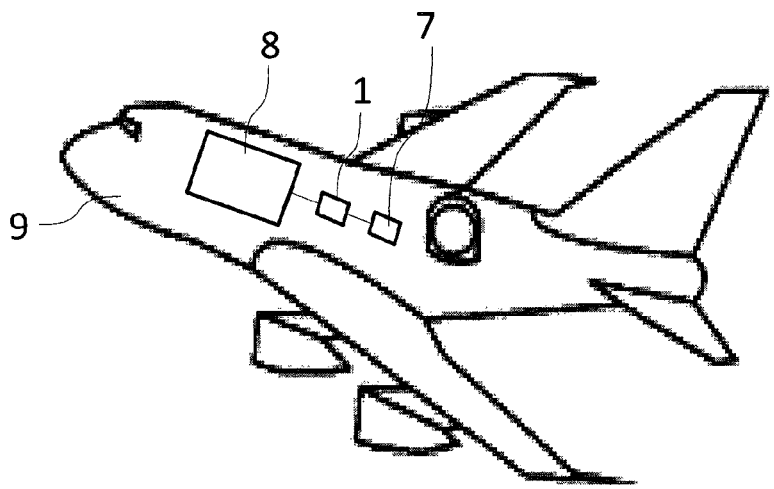
FIG. 2 is a schematic representation of an aircraft or spacecraft comprising an interface device according to a further embodiment of the present invention.

FIG. 2 is a schematic representation of an aircraft or spacecraft 9 comprising an interface device 1 according to a further embodiment of the present invention. The aircraft or spacecraft 9 can comprise, for example, a cabin monument 8 which is electrically connected to a vehicle-side interface 7 via an interface device 1, for example the interface device 1 shown in FIG. 1. The cabin monument 8 can comprise any type of internal device component of the aircraft or spacecraft 9, for example a galley, a sanitary device, an infotainment system or the like.

Figure 3:
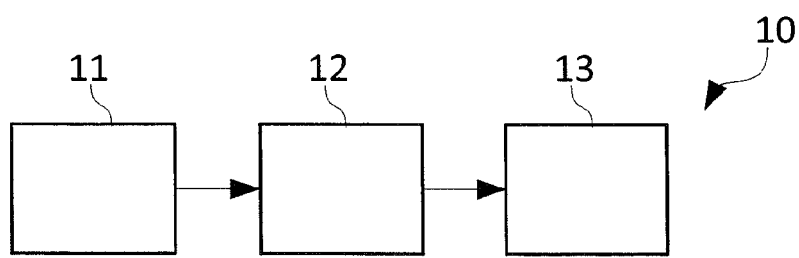
FIG. 3 is a schematic representation of a method for electrically connecting a cabin monument to an aircraft or spacecraft according to a further embodiment of the present invention.

FIG. 3 is a schematic representation of a method 10 for electrically connecting a cabin monument to an aircraft or spacecraft, in particular to an interface device 1 shown by way of example in FIG. 1. The method 10 can be used, for example, in an aircraft or spacecraft 9 as shown in FIG. 2.

In a first step 21, an electrical connection is established between the cabin

Although the present invention has been described in the present context on the basis of preferred embodiments, it is not restricted thereto, but can be modified in many different ways.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An interface device for a cabin monument, in particular for assembly in an aircraft or spacecraft, comprising:
   a routing device;
   a first plurality of interface connection sockets, which are connected to the routing device via a first plurality of connection lines and to which a vehicle interface of the aircraft or spacecraft can be connected; and
   a second plurality of interface connection sockets, which are connected to the routing device via a second plurality of connection lines and to which a cabin monument can be connected;
wherein the routing device is constructed so as to selectively electrically connect interface connection sockets of the first plurality of interface connection sockets to interface connection sockets of the second plurality of interface connection sockets and in such a way that a three-phase current supply is provided for certain components of the cabin monument.

2. The interface device according to claim 1, wherein the routing device comprises an interface for programming the selective connection of the interface connection sockets.

3. An aircraft or spacecraft, comprising an interface device according to claim 2.

4. An aircraft or spacecraft according to claim 3, further comprising:
   a cabin monument, which is electrically connected to a vehicle interface of the aircraft or spacecraft via the interface device.

5. The interface device according to claim 1, wherein the first plurality of interface connection sockets comprises interface connection sockets for supplying current and/or exchanging data.

6. An aircraft or spacecraft, comprising an interface device according to claim 5.

7. An aircraft or spacecraft according to claim 6, further comprising:
   a cabin monument, which is electrically connected to a vehicle interface of the aircraft or spacecraft via the interface device.

8. A method for electrically connecting a cabin monument to an aircraft or spacecraft, comprising the steps of:
   establishing an electrical connection between the cabin monument and an interface device, which comprises a routing device, via a first plurality of interface connection sockets;
   establishing an electrical connection between the interface device and a vehicle interface of the aircraft or spacecraft via a second plurality of interface connection sockets; and
   selectively connecting interface connection sockets of the first plurality of interface connection sockets to interface connection sockets of the second plurality of interface connection sockets by means of the routing device and in such a way that a three-phase current supply is provided for certain components of the cabin monument.

9. The method according to claim 8, wherein establishing the electrical connection between the cabin monument and an interface device comprises establishing a plug-in connection to a plug of the interface device.

10. The method according to claim 8, wherein establishing the electrical connection between the interface device and a vehicle interface of the aircraft or spacecraft comprises establishing a plug-in connection to a plug of the aircraft or spacecraft.

11. An aircraft or spacecraft, comprising an interface device according to claim 1.

12. An aircraft or spacecraft according to claim 11, further comprising:
   a cabin monument, which is electrically connected to a vehicle interface of the aircraft or spacecraft via the interface device.

* * * * *